June 18, 1963　　　C. B. SIPE　　　3,094,215
HOLDER
Filed Sept. 21, 1960

INVENTOR.
CHARLES B. SIPE
BY
Lockwood, Woodard, Smith & Weikert
Attorneys

3,094,215
HOLDER
Charles B. Sipe, 903 Electric Bldg., Indianapolis, Ind.
Filed Sept. 21, 1960, Ser. No. 57,468
4 Claims. (Cl. 211—13)

The present invention relates to a rack or holder finding primary utility as a holder for pan covers.

In the present-day kitchen, the storing of pot and pan covers is in many cases accomplished by placing the covers in a drawer or cabinet. Because of the fact that the covers are usually provided with handles located concentrically of the covers which provide irregular shapes and contours, it is difficult to stack the covers in an orderly fashion. Such covers can be placed in a drawer; however, frequently the desired cover will be the one at the bottom of the drawer, necessitating the removal of all of the covers from the drawer.

It is, therefore, an object of the present invention to provide an improved rack or holder which is durable and inexpensive to manufacture and is capable of holding pot and pan covers so that they are easily accessible.

A further object of the present invention is to provide a rack or holder which supports the covers securely and so that they provide a neat, orderly appearance.

A further object of the invention is to provide an improved rack or holder which may be compressed into a relatively small space for packing and shipping or storing.

Related objects and advantages will appear as the description proceeds.

In accordance with the present invention, one embodiment thereof comprises a holder including a length of wire formed into a plurality of connected loops, each including a pair of straight converging portions joined by a bight. Each of the loops extends in the same direction with the bight at the distal end thereof and having a sufficiently sharp curvature to retain the handle of a pan cover. The loops are arranged in spaced parallel planes and are joined to adjacent loops by diagonally extending portions of the length of wire, said last mentioned portions joining one straight portion of each loop to the diagonally located straight portion of an adjacent loop whereby the holder, which is formed of resilient wire, may be compressed.

The full nature of the invention will be understood from the accompanying drawings and the following description and claims.

FIG. 6 is a side elevation of this alternative embodiment showing it mounted upon a cabinet or the like.

Figure 1:
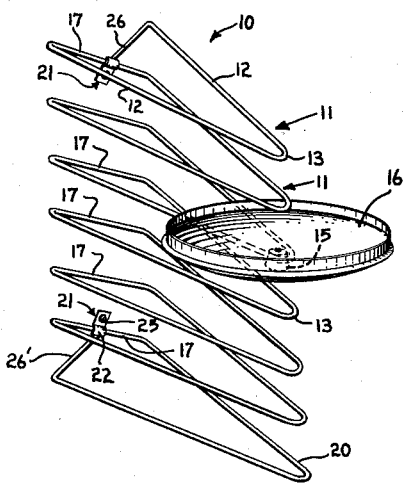
FIG. 1 is a perspective view of a holder embodying the present invention.

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to the drawings, there is illustrated in FIG. 1 a pan cover holder comprising a single length of wire 10 which may be suitably formed by the use of a very simple jig, the wire being bent about a plurality of suitably located nails or projections. The wire 10 is formed to define a plurality of connected loops 11 each of which include a pair of straight converging portions 12 which are connected together by a bight 13.

It should be noted that each of the loops 11 extend in the same direction with the bight at the distal end thereof and are arranged in spaced parallel planes. The bight 13 of each loop is of sufficiently sharp curvature to retain the handle 15 of a pan cover 16. Each of the loops is connected to its adjacent loop by means of the diagonal portion 17 which extends from one straight portion of each loop to the diagonally located straight portion of the adjacent loop.

In other words, the parallel straight portions of each adjacent pair of loops are not connected together but instead, the diagonally opposite straight portions of adjacent loops are connected together. Because of the resilient nature of the wire making up the holder of FIG. 1, this diagonal arrangement of the portions 17 makes possible the pressing together of the structure by forcing the outermost loops toward one another whereby the holder may be packed in a very small space in compressed relation for shipping or storing. It should be noted that the lowermost loop 20 of the loops 11 extends a greater distance from its diagonal portion 17 than do the remaining loops 11 and the remaining loops extend progressively lesser distances from the diagonal portions according to their spacing from the loop 20.

The pan cover holder of FIG. 1 is secured to a cabinet door, to the underneath side of a shelf or in any similar location by means of a pair of cleats 21 which have an arcuate portion 22 receiving the outermost diagonal portions 17. The cleats 21 are each formed with a suitable bore which receives a screw 25 which acts to hold each cleat against the cabinet door or the like and to cause the cleat, in turn, to hold the outermost diagonal portion 17 by means of its arcuate shaped portion 22. It should be noted that the ends 26 and 26' of the length of wire are formed in a reversely extending manner whereby they are arranged perpendicularly to the outermost diagonal portion 17.

Figure 2:
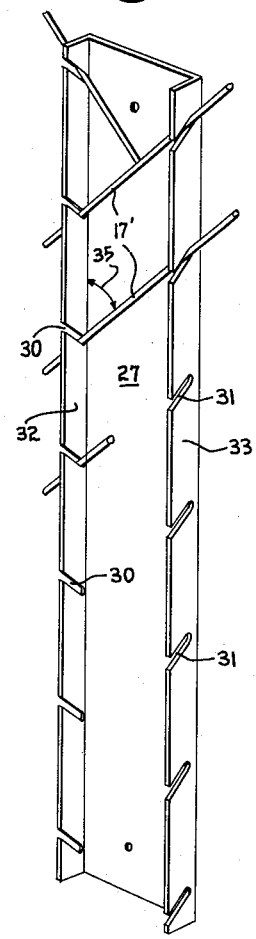
FIG. 2 is a perspective view of a rearward side of an alternative embodiment of the present invention, one portion of which is a channel-shaped element.
Figure 3:
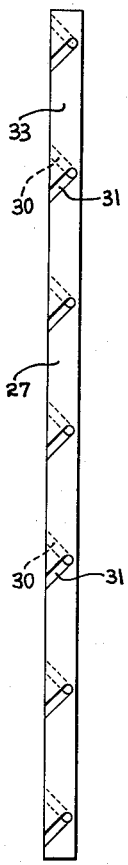
FIG. 3 is a side elevation of the channel-shaped element of FIG. 2.
Figure 4:
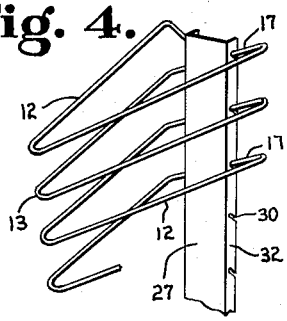
FIG. 4 is a perspective view taken in a different direction of the embodiment of FIGS. 2 and 3.

Referring now to FIGS. 2–5, an alternative embodiment of the invention is illustrated which is identical to the above described embodiment except for the fact that the cleats 21 are replaced by a channel 27 which not only holds the end portions of the holder structure against the cabinet door or the like but also provides a support for the central portion of the holder. The channel 27 is provided with a plurality of slots 30 and 31 equally spaced along the opposite projecting legs 32 and 33 of the channel 27 and extending in opposite directions in order to retain the diagonal portions 17' of the holder therein. It should be noted that the preferable angle of the diagonal portions 17' with respect to the length of the channel is approximately 40 to 60 degrees. That is, the angle 35 of FIG. 2 is between approximately 40 to approximately 60 degrees. It can be appreciated that because of the fact that the slots 31 extend in an opposite direction to the slots 30 that the diagonal portion 17 will be locked in position within the slots. In some embodiments of the present device, this locking action will not be needed because the channel will be fixed directly against a cabinet door or the like; however the oppositely extending slots 30 and 31 will serve to prevent looseness of the wire in the channel.

Figure 5:
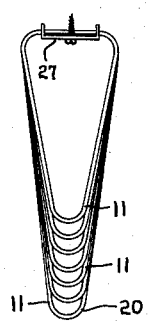
FIG. 5 is a top view of the embodiment of FIGS. 2–4.
Figure 6:
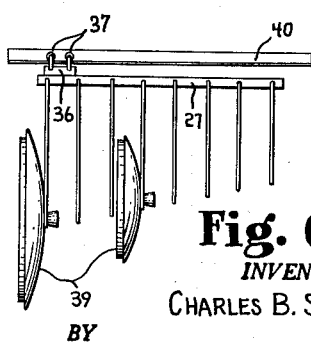

Referring to FIG. 6, the channel 27 is shown mounted upon a mounting block 36 which has rollers 37 rotatably mounted thereon and received upon a track 40 which may be slidably mounted upon a cabinet, for example, in such a manner that the holder or rack of the present invention may be placed within the cabinet and the door thereof closed. Pot and pan covers 39 are shown as they would be received in the holder with its loops in downwardly projecting position. FIG. 5 illustrates the fact that the various loops 11 extend progressively lesser distances as compared to the lowermost loop 20.

Figure 7:
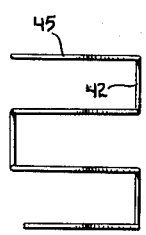
FIG. 7 is a fragmentary front elevation of a further alternative embodiment of the invention.

FIG. 7 illustrates a further embodiment of the present invention which, instead of the diagonal portion 17, includes upright portions 42 connecting the parallel side portions of adjacent loops 45 of the rack. These loops 45 are shaped in exactly the same manner as the loops 11.

From the above description, it can be appreciated that the present invention provides an improved rack or holder which is durable, inexpensive to manufacture and is capable of holding pot and pan covers so that they are easily accesible. It should be emphasized that the "single wire" holder of the present invention is less expensive than other holders of the same type because of the relatively easy and inexpensive operations involved in manufacturing the holder. It can also be appreciated that the present invention provides a rack or holder which supports the covers securely so that they provide a neat and orderly appearance. It can further be appreciated that the present invention provides an improved rack or holder which can be compressed into a relatively small space for packing and shipping or storing.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claims are also desired to be protected.

The invention claimed is:

1. A holder comprising a length of wire formed into a plurality of connected loops each including a pair of straight converging portions joined by a bight, each of said loops extending in the same direction with the bight at the distal end thereof, said bight being of sufficiently sharp curvature to retain the handle of a pan cover, said loops being arranged in spaced parallel planes and joined to adjacent loops by diagonally extending portions of said length of wire, said last mentioned portions joining one straight portion of each loop to the diagonally located straight portion of an adjacent loop, and means for mounting said holder.

2. A holder comprising a length of wire formed into a plurality of connected loops each including a pair of straight converging portions joined by a bight, each of said loops extending in the same direction with the bight at the distal end thereof, each of said bights being of sufficiently sharp curvature to retain the handle of a pan cover, said loops being arranged in spaced parallel planes and joined to adjacent loops by diagonally extending portions of said length of wire, said last mentioned portions joining one straight portion of each loop to the diagonally located straight portion of an adjacent loop, one of the outermost of said loops being proportioned to extend the farthest from said diagonal portions, the remainder of said plurality of loops extending progressively lesser distances from said diagonal portions according to their spacing from said outermost loop, and means for mounting said holder.

3. The holder of claim 2, said means comprising a channel having slotted projecting sides, said diagonal portions being received in the slots of said projecting sides, said slots being equally spaced along each side of said channel, each slot in one side of said channel being spaced directly oppositely from a corresponding one of said slots in the opposite side of said channel, the slots in one side of said channel angling oppositely from the slots in the other side of said channel whereby said diagonal portions are locked in said slots.

4. The holder of claim 2, said means comprising a channel having slotted projecting sides, said diagonal portions being received in the slots of said projecting sides, said slots being equally spaced along each side of said channel, each slot in one side of said channel being spaced directly oppositely from a corresponding one of said slots in the opposite side of said channel.

References Cited in the file of this patent

UNITED STATES PATENTS

| | | |
|---|---|---|
| 941,653 | Rothengatter | Nov. 30, 1909 |
| 1,065,000 | Sarter | June 17, 1913 |
| 1,176,009 | Weimar | Mar. 21, 1916 |
| 1,611,231 | Ratterman | Dec. 21, 1926 |
| 1,667,264 | Minnick | Apr. 24, 1928 |
| 1,986,486 | Swanson | Jan. 1, 1935 |
| 2,608,305 | Sager | Aug. 26, 1952 |
| 2,972,414 | Sipe | Feb. 21, 1961 |

FOREIGN PATENTS

| | | |
|---|---|---|
| 696,665 | Great Britain | Sept. 2, 1953 |